United States Patent
Soto et al.

(10) Patent No.: US 10,711,697 B2
(45) Date of Patent: Jul. 14, 2020

(54) ROTATABLE AND ADJUSTABLE HOSE FOR GAS TURBINE

(71) Applicant: General Electric Company, Schenectady, NY (US)

(72) Inventors: Jesus Wilfrido Soto, Queretaro (MX); Luis Garza, Queretaro (MX); Juan Patino, Queretaro (MX)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 15/459,544

(22) Filed: Mar. 15, 2017

(65) Prior Publication Data

US 2018/0266326 A1 Sep. 20, 2018

(51) Int. Cl.
*F02C 7/00* (2006.01)
*F02C 7/22* (2006.01)
*F16L 37/52* (2006.01)
*F16L 27/06* (2006.01)

(52) U.S. Cl.
CPC .............. *F02C 7/22* (2013.01); *F02C 7/222* (2013.01); *F16L 37/52* (2013.01); *F16L 27/06* (2013.01)

(58) Field of Classification Search
CPC ............ F02C 7/222; F16L 37/52; F16L 27/06
See application file for complete search history.

(56) References Cited

U.S. PATENT DOCUMENTS 3,997,197 A * 12/1976 Marsh .................. B23Q 1/0018
285/93
2015/0322862 A1* 11/2015 Fuller ..................... F02C 7/222
60/739

OTHER PUBLICATIONS

Vosta LMG, "Vosta LMG introduces Greenforce ball joint", 4 pages, undated, http://pdf.nauticexpo.com/pdf/vosta-lmg-bv/leaflet-balljoint-english/32385-60055.html.

* cited by examiner

*Primary Examiner* — Todd E Manahan
*Assistant Examiner* — Katheryn A Malatek
(74) *Attorney, Agent, or Firm* — Nixon & Vanderhye P.C.

(57) ABSTRACT

A gas turbine engine system includes a fuel delivery circuit configured to convey fuel, a combustion chamber configured to combust the fuel, and a flexible hose that fluidly connects the fuel delivery circuit to the combustion chamber. The flexible hose includes a combustion chamber connector portion attached to the combustion chamber, a fuel delivery circuit connector portion attached to the fuel delivery circuit, and a central flexible portion connecting the first connector portion to the second connector portion. The central flexible portion is made of a flexible material. In addition, the fuel delivery circuit connector portion includes a pivotal assembly with an adjustable end that is pivotal relative to a central longitudinal axis of the central flexible portion of the flexible hose when the central flexible portion is in a straight condition.

25 Claims, 10 Drawing Sheets

ROTATABLE AND ADJUSTABLE HOSE FOR GAS TURBINE

FIELD OF THE INVENTION

The subject matter disclosed herein relates to supplying fluid to a gas turbine component and other large industrial machines. The subject matter disclosed herein relates particularly to a rotatable and adjustable flexible hose for supplying fuel to a gas turbine combustion chamber.

BACKGROUND OF THE INVENTION

An industrial gas turbine includes a combustor formed by a circular array of combustion chambers, which are also referred to as combustion cans. Each chamber has an end cover that includes openings which receive fuel by way of a dedicated flexible hose. The flexible hoses are, in turn, attached to a manifold that supplies the fuel to the system.

By contorting the flexible hoses, the flexible hoses are able to account for some positional tolerances between the manifold outlets and the combustion chamber openings. However, the flexibility of each hose is limited by the properties of the material from which the hose is formed. In addition, the thickness and diameter of the hose may further limit the flexibility of the hose.

If the positional tolerances between the manifold outlets and the combustion chamber openings are too great, the flexibility of the hose might be enough to avoid a mismatch. When there is a mismatch, the hose might not be able to provide a sufficient connection with the combustion chamber and/or the piping manifold. When a mismatch is unavoidable, a new flexible hose or an adaptor may need to be ordered, thereby increasing the amount of time needed to bring the gas turbine online. Alternatively, the mismatched flexible hose may be forced into the desired connection, thereby resulting in undesired end angles in the flexible hose, which could lead to suboptimal performance of the combustion chamber and/or flexible hose. The undesired end angles may also lead to premature hose wear and/or hose failure.

Thus, there is a long felt need for a more adaptable flexible hose capable of handling any mismatch between the manifold and the combustion chamber openings.

BRIEF SUMMARY OF INVENTION

Aspects of the system and method for supplying fluid to a gas turbine component and other large industrial machines described herein provide solutions to one or more problems or disadvantages associated with the prior art.

In one exemplary but non-limiting aspect, the present disclosure relates to a gas turbine engine system including a fuel delivery circuit configured to convey fuel, a combustion chamber configured to combust the fuel, and a flexible hose that fluidly connects the fuel delivery circuit to the combustion chamber. The flexible hose may include a combustion chamber connector portion attached to the combustion chamber, a fuel delivery circuit connector portion attached to the fuel delivery circuit, and a central flexible portion connecting the first connector portion to the second connector portion. The central flexible portion may be made of a flexible material. In addition, the fuel delivery circuit connector portion may include a pivotal assembly with an adjustable end that is pivotal relative to a central longitudinal axis of the central flexible portion of the flexible hose when the central flexible portion is in a straight condition.

In another exemplary but non-limiting aspect, the present disclosure relates to a gas turbine engine system that includes a fuel delivery circuit configured to convey fuel, a combustion chamber configured to combust the fuel, and a flexible hose that fluidly connects the fuel delivery circuit to the combustion chamber. The flexible hose may have a bendable portion made of a flexible material that allows the bendable portion to bend. A pivotal portion of the hose may include a ball and socket connection that allows a first end of the hose to pivot relative to a central longitudinal axis of the flexible hose when the flexible hose is in a straight condition.

In yet another exemplary but non-limiting aspect, the present disclosure relates to a gas turbine engine system that includes a fuel delivery circuit configured to convey fuel, a combustion chamber configured to combust the fuel, and a flexible hose that fluidly connects the fuel delivery circuit to the combustion chamber. The flexible hose may include a central bendable region with a first minimum bending radius and a second bendable region with a second minimum bending radius. The first minimum bending radius may be greater than the second minimum bending radius.

Utilizing a hose with different sections having different bending capabilities may increase the adaptability of the hose. For example, a ball and socket portion of a hose might allow for a sharper bend (without collapsing the hose) than a portion of the hose that relies on the flexibility of the material to bend. Thus the different sections of the hose with different bending capabilities cooperate to increase the variety of possible shapes the hose is able to be contorted into. Accordingly, the number of configurations leading to a possible mismatch is reduced or even eliminated.

Using a hose with multiple sections having different bending capabilities could reduce the amount of time needed to bring the gas turbine online. Also, the multiple sections having different bending capabilities could reduce or eliminate the need to force the hose into the desired connection thereby reducing or avoiding connections with undesired end angles.

DETAILED DESCRIPTION OF THE INVENTION

Figure 1:
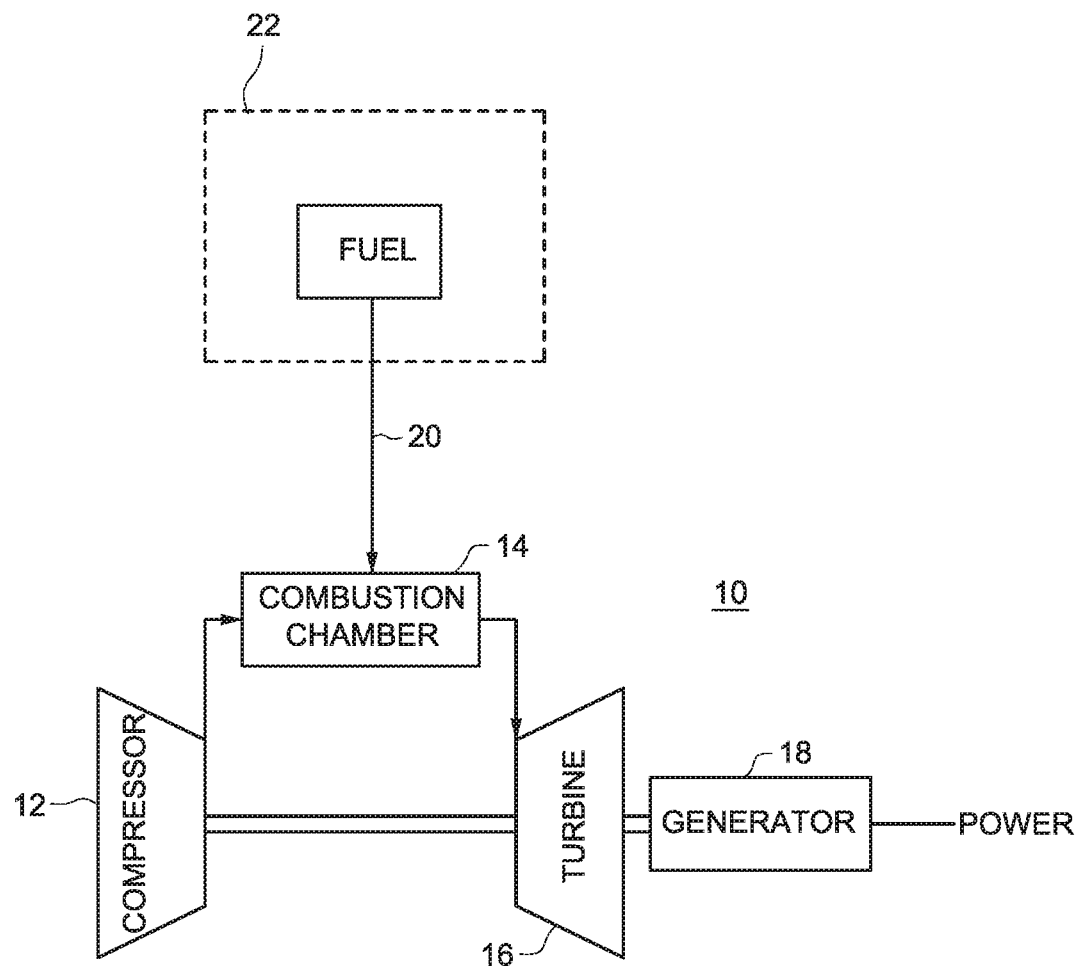
FIG. 1 is a schematic illustration of an exemplary gas turbine engine system.

FIG. 1 illustrates an exemplary but non-limiting system that includes a gas turbine engine 10 with a compressor 12, a combustion chamber 14, a turbine 16, and a generator 18. The gas turbine engine 10 runs on a combustible fuel delivered through a fuel line 20. A fuel delivery circuit 22 may contain several lines (fuel, purge air, etc), but is illustrated with a minimal number of lines for simplicity.

Figure 2:
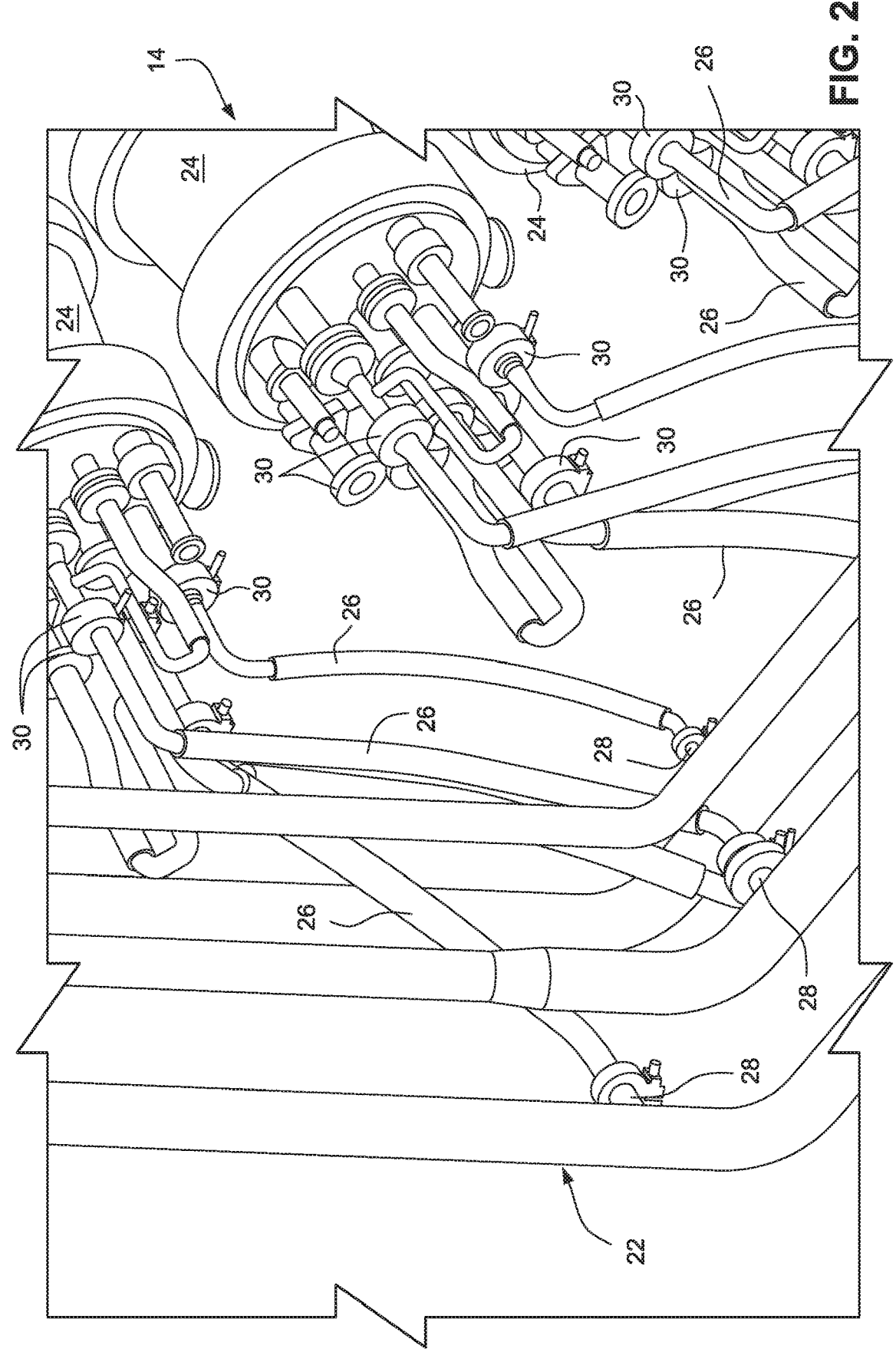
FIG. 2 is a perspective view of the fuel delivery circuit and the combustion chamber portion of the exemplary gas turbine engine system of FIG. 1.

FIG. 2 is a more detailed illustration of the fuel delivery circuit 22 and the combustion chamber 14. The fuel delivery circuit 22 may include a piping manifold. In addition, the combustion chamber 14 may include a plurality of cans 24. The piping manifold may supply fuel to the cans 24 by way of a plurality of flexible hoses 26. As can be seen, the outlets 28 of the fuel delivery circuit 22 and the inlets 30 of the cans 24 may be axially offset.

Figure 3:
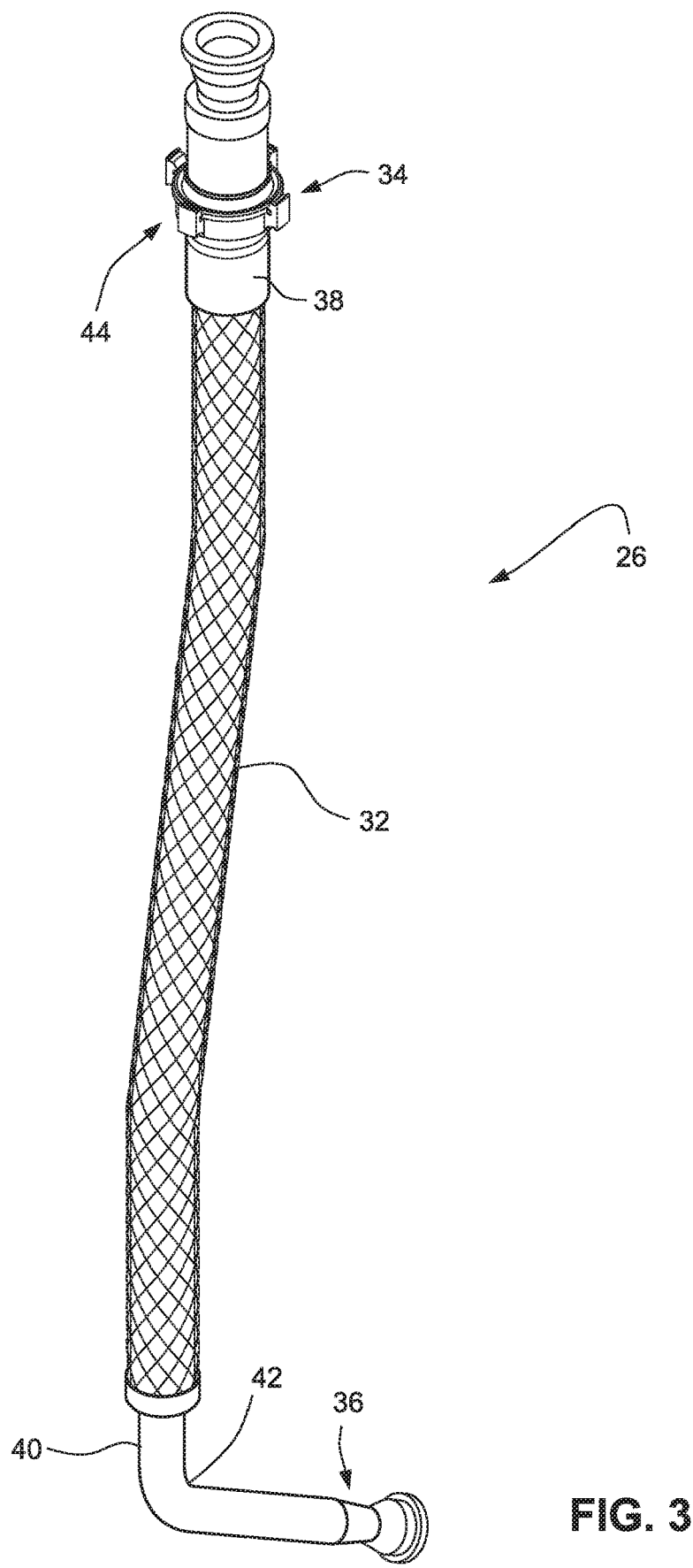
FIG. 3 is a perspective view of one of the hoses that connect the fuel delivery circuit to the combustion chamber portion.

FIG. 3 illustrates one of the flexible hoses 26 illustrated in FIG. 2. The flexible hose 26 may include a central flexible portion 32 in between a first connector portion 34 and a second connector portion 36. The first connector portion 34 may be connected to one of the outlets 28 of the fuel delivery circuit 22. The second connector portion 36 may be connected to one of the inlets 30 of the cans 24.

The central flexible portion 32 may be made of any flexible material that is able to flex while maintaining the shape of an interior lumen (not shown). In addition, it is desired that the flexible material be able to convey the fuel without reacting to the fuel in order to minimize corrosion. For example, the central flexible portion 32 may be made of braided metal, rubber, neoprene, etc. The flexible material may allow the flexible hose 26 to span the axial offset between the outlets 28 of the fuel delivery circuit 22 and the inlets 30 of the cans 24.

The first and second connector portions 34, 36 may be rigidly connected to the opposing ends of the central flexible portion 32 and may be made of rigid material such as metal or plastic. In addition, the first and second connector portions 34, 36 may include the straight portions 38 and 40, respectively. The straight portions 38 and 40 may be fixed to the ends of the central flexible portion 32 so that the flexible hose does not flex at the transition between the central flexible portion 32 and the straight portion 38 and the central flexible portion 32 does not flex at the transition between the central flexible portion 32 and the straight portion 40. The straight portions 38 and 40 may extend from the central flexible portion 32 and may help reduce turbulence and pressure drop through the flexible hose 26.

The first and second connector portions 34, 36 may be further configured to account for the offset between the outlets 28 of the fuel delivery circuit 22 and the inlets 30 of the cans 24. For example, the second connector portion 36 may include an elbow or bend 42. In addition, the first connector portion 34 may include a pivotal assembly 44. In addition, it is contemplated that either or both of the first and second connector portions 34, 36 may be made from flexible material (instead of rigid material), which may or may not be the same material from which the central flexible portion 32 is made. Alternatively, either or both of the first and second connector portions 34, 36 may be may of a combination of flexible and rigid materials.

Figure 4:
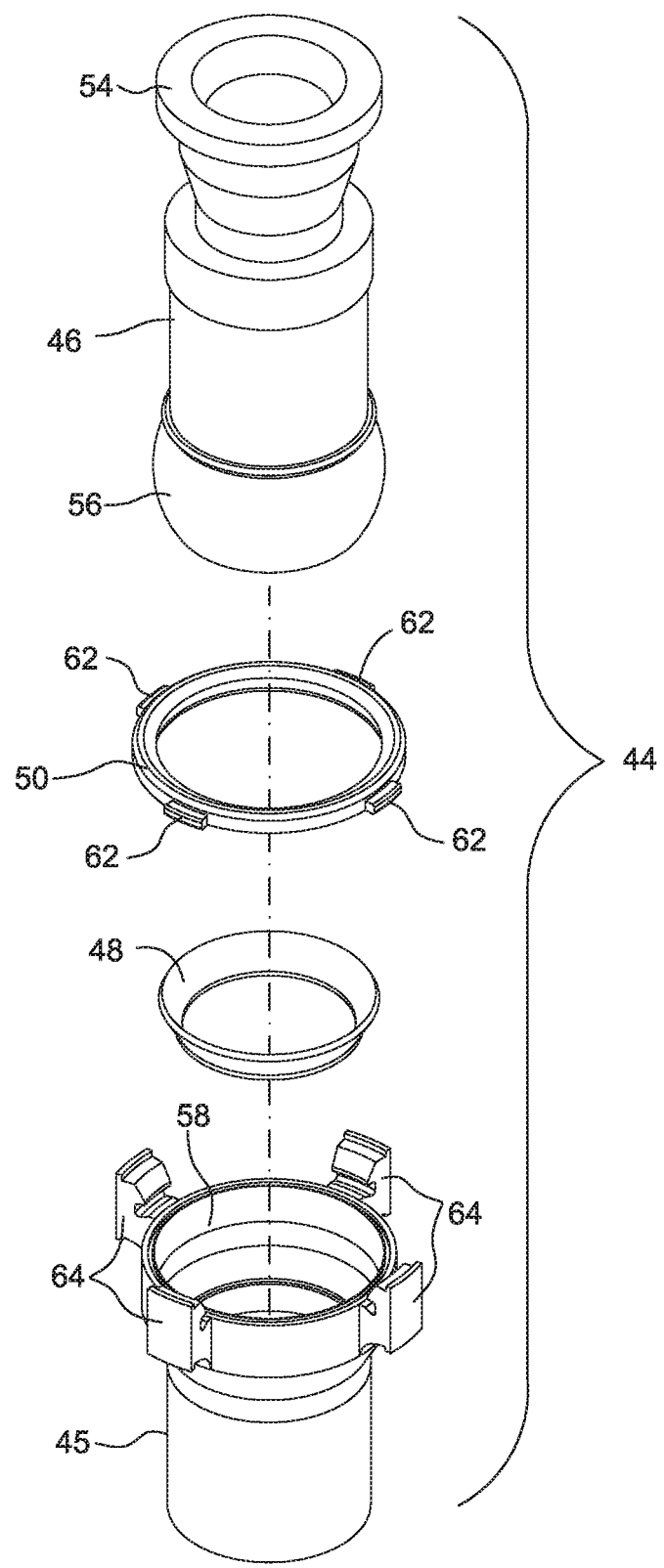
FIG. 4 is an exploded view of an exemplary adjustable portion of the hose.
Figure 5:
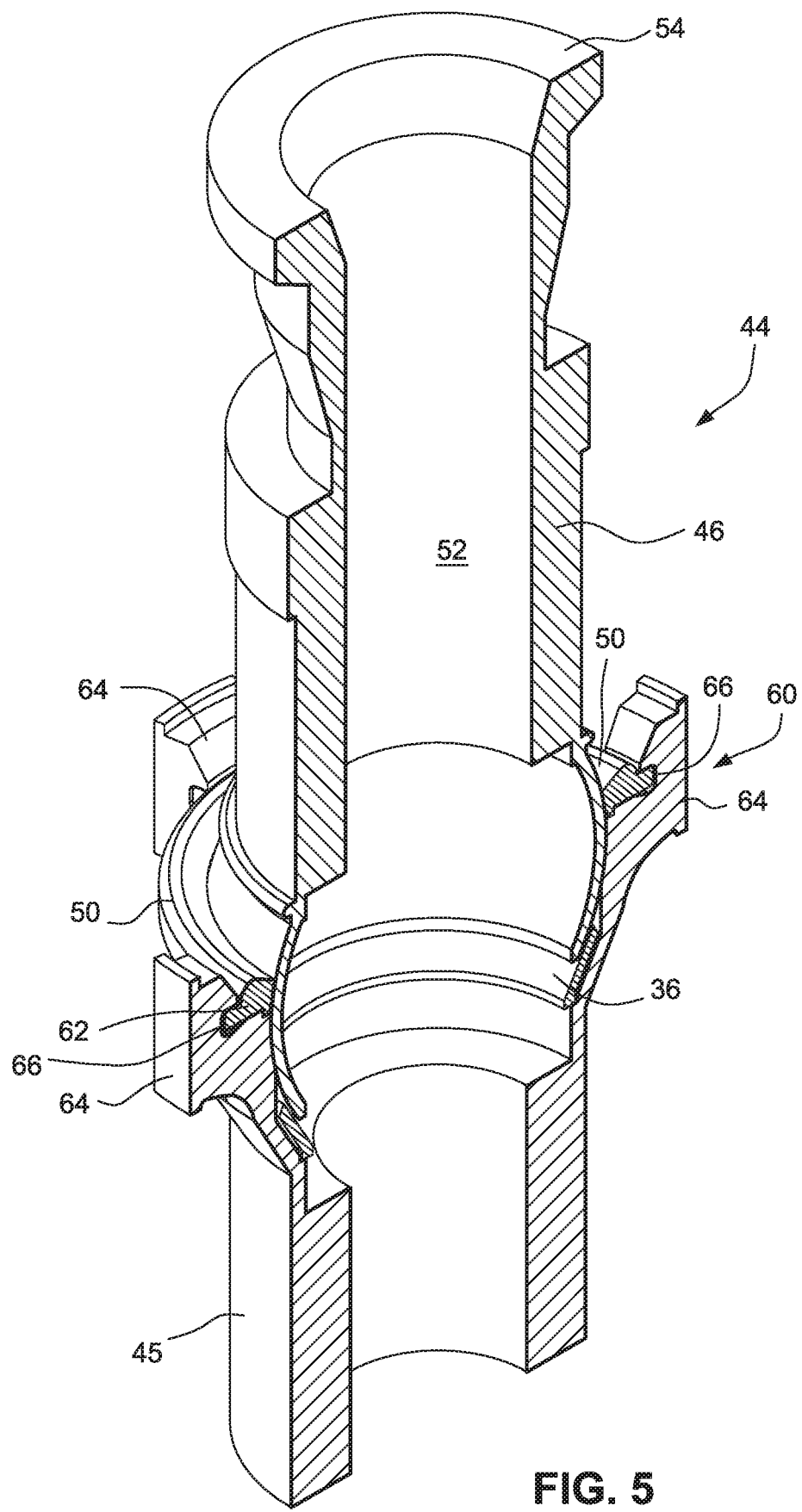
FIG. 5 is a cross-sectional view of the exemplary adjustable portion of the hose.

FIGS. 4 and 5 respectively show an exploded view and a cross-sectional view of the pivotal assembly 44. The primary components of the pivotal assembly 44 may include a fixed portion 45 (which may include all or part of the straight portion 38), an adjustable portion 46, a frusto-conical seal 48 and a ring 50. When assembled, the fixed portion 45, the adjustable portion 46 and the frusto-conical seal 48 may form a fluid flow path 52 that extends the length of the flexible hose 26.

The adjustable portion 46 may include a connection end 54 having a flange that is secured to one of the outlets 28 of the fuel delivery circuit 22 by way of bolts or other fastening devices. The adjustable portion 46 may also include a pivoting end 56 that partially sits within a receiving space 58 of the fixed portion 45.

The pivoting end 56 may have a sphere-like shape. At the same time, the receiving space 58 may have a concave inner surface that forms a bowl-like shape that is complimentary to the sphere-like shape of the pivoting end 56. When the pivoting end 56 is received within the receiving space 58, the adjustable portion 46 and the fixed portion 45 may form a "ball and socket" connection.

The frusto-conical seal 48 may be received within the receiving space 58 prior to the pivoting end 56. The frusto-conical seal 48 may be oriented so that the side with the smaller diameter faces the fixed portion 45 and the side with the greater diameter faces the adjustable portion 46. The frusto-conical seal 48 may act as a seat for the pivoting end 56 and may prevent leakage of any fuel from between the receiving space 58 and the pivoting end 56. It is contemplated that the frusto-conical seal 48 may be made of any material capable of sealing a connection between components. For example, the frusto-conical seal 48 may be made of flexible rubber, silicone, plastic, etc.

Figure 6:
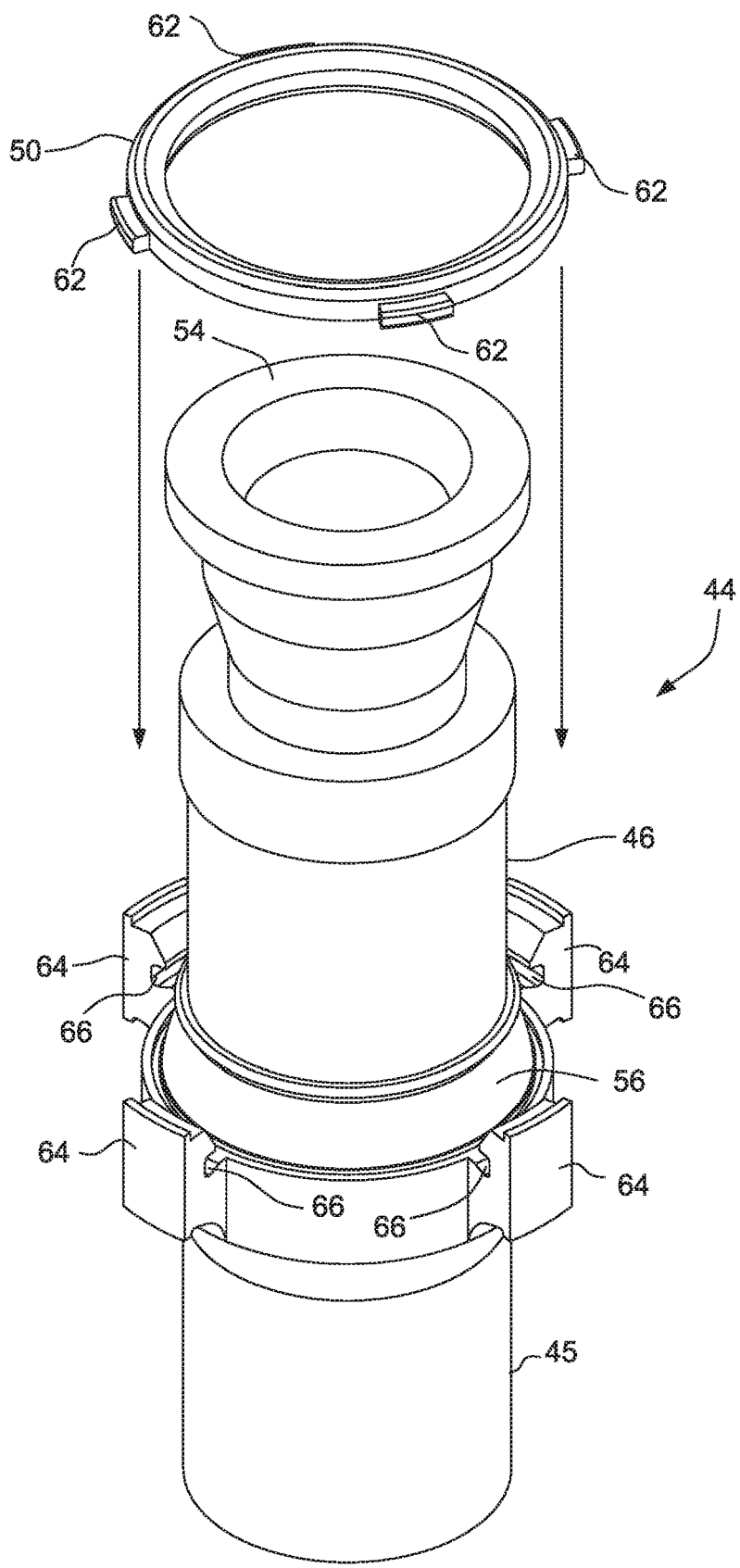
FIG. 6 is a perspective view of the adjustable portion of the hose.
Figure 7:
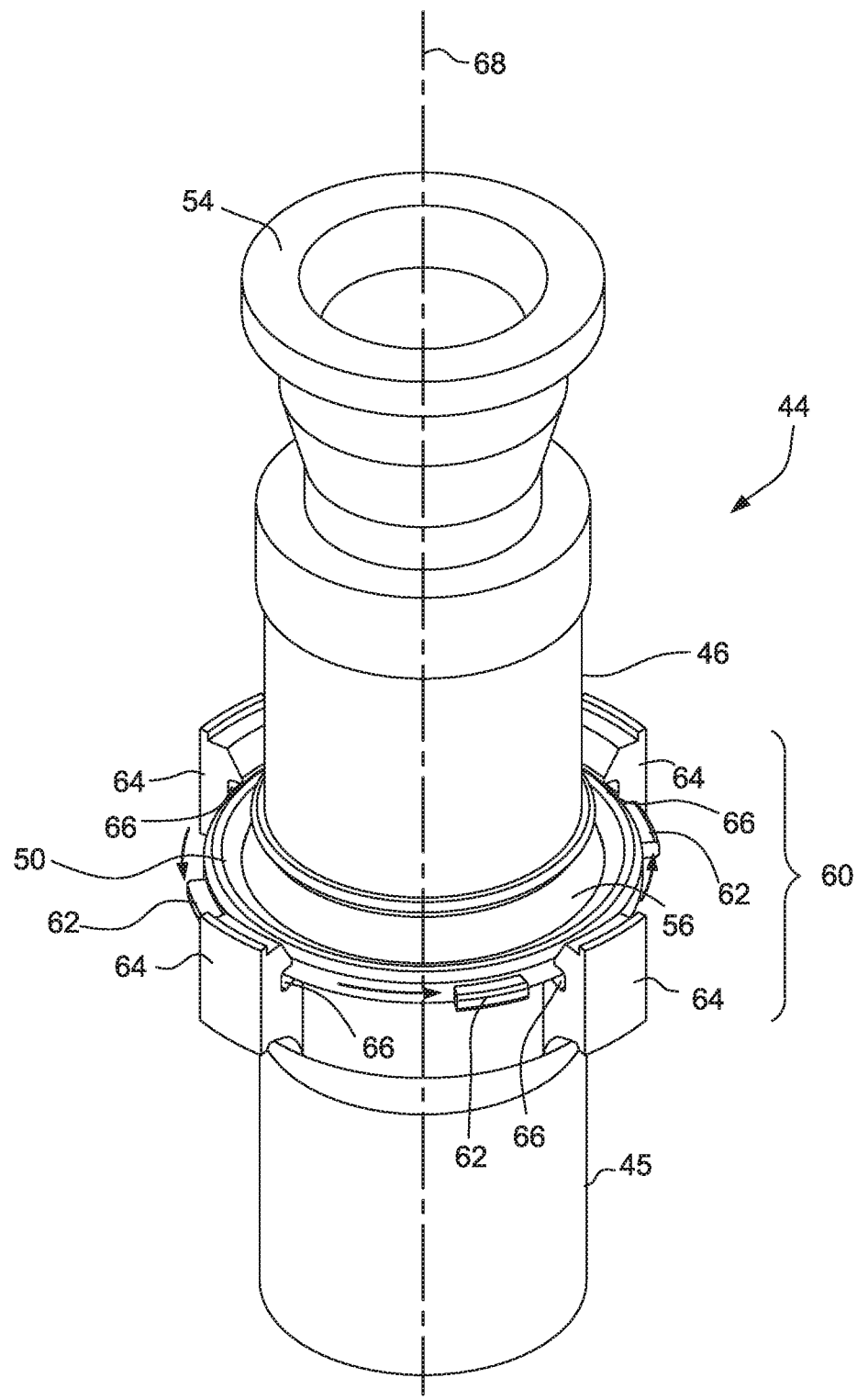
FIG. 7 is another perspective view of the adjustable portion of the hose.

Once the adjustable portion 46 and the frusto-conical seal 48 are assembled to the fixed portion 45, the ring 50 may be added. As illustrated in FIGS. 6 and 7, during assembly, the ring 50 may slide over an exterior of the adjustable portion 46 and interlocks with the fixed portion 45, thereby securing the adjustable portion 46 to the fixed portion 45.

The ring 50 and the fixed portion 45 together may form a locking mechanism 60 that secures the adjustable portion 46 to the straight portion 38. In one exemplary configuration, the ring 50 may include a certain number of projections 62, while the fixed portion 45 may include the same number of catches 64 so that each projection 62 corresponds to a particular catch 64. In addition, each catch 64 may have a groove 66.

As can be seen in FIG. 6, the ring 50 may be slid down an exterior of the adjustable portion 46 with the projections 62 offset from the catches 64 so that when the ring 50 rests against the catches 64 of the fixed portion 45, each projection 62 is between two catches 64.

As illustrated in FIG. 7, once the ring 50 is resting on the catches 64, the ring 50 is rotated around a central longitudinal axis 68 of the fixed portion 45 until each projection 62 is received within a respective groove 66. In other words, the ring 50 may secure the adjustable portion 46 to the fixed portion 45 by moving the ring 50 in an axial direction toward the fixed portion 45 and then rotating the ring 50 in a radial direction until the projections 62 are aligned with the catches 64.

Figure 8:
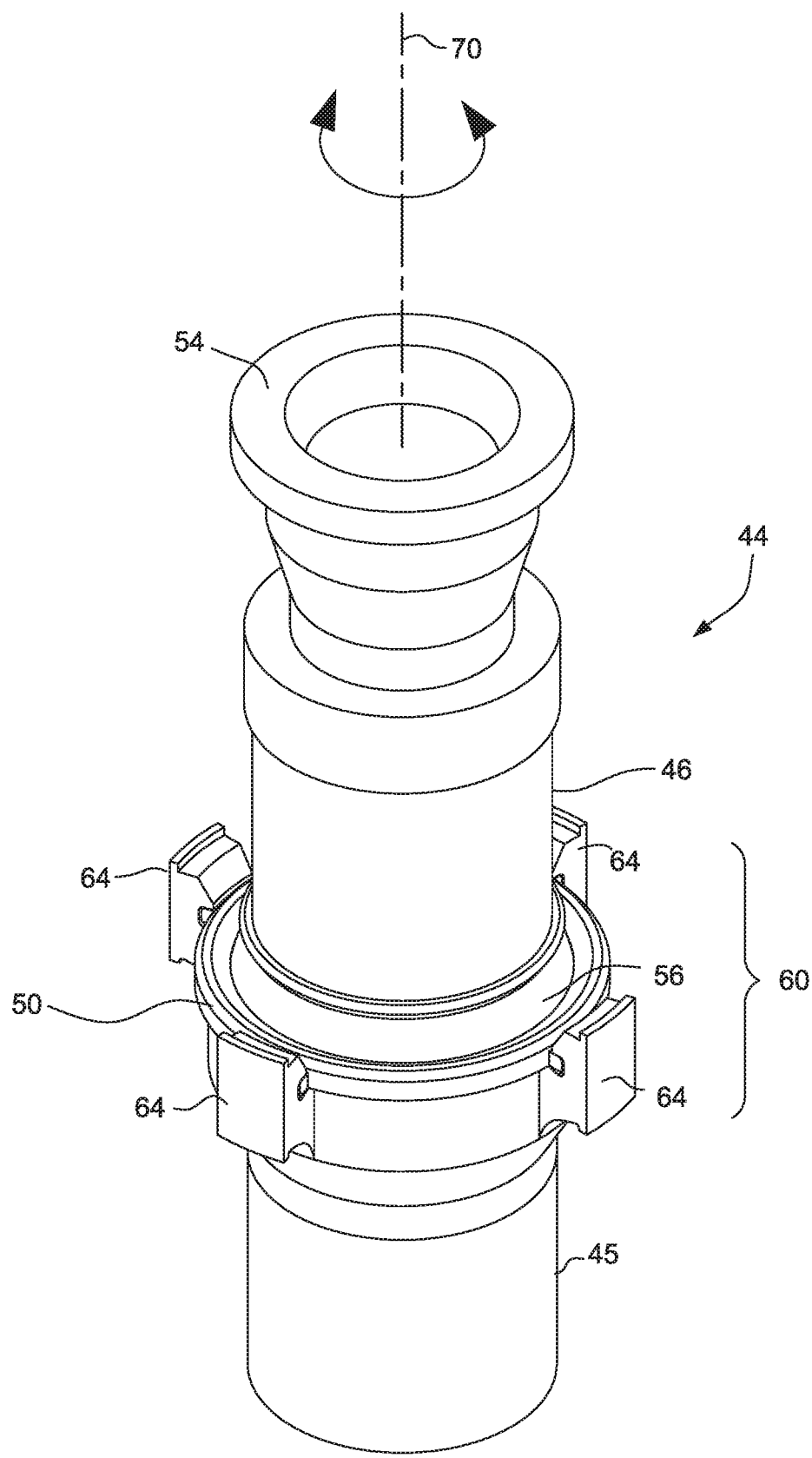
FIG. 8 is another perspective view of the adjustable portion of the hose.
Figures 9, 9A:
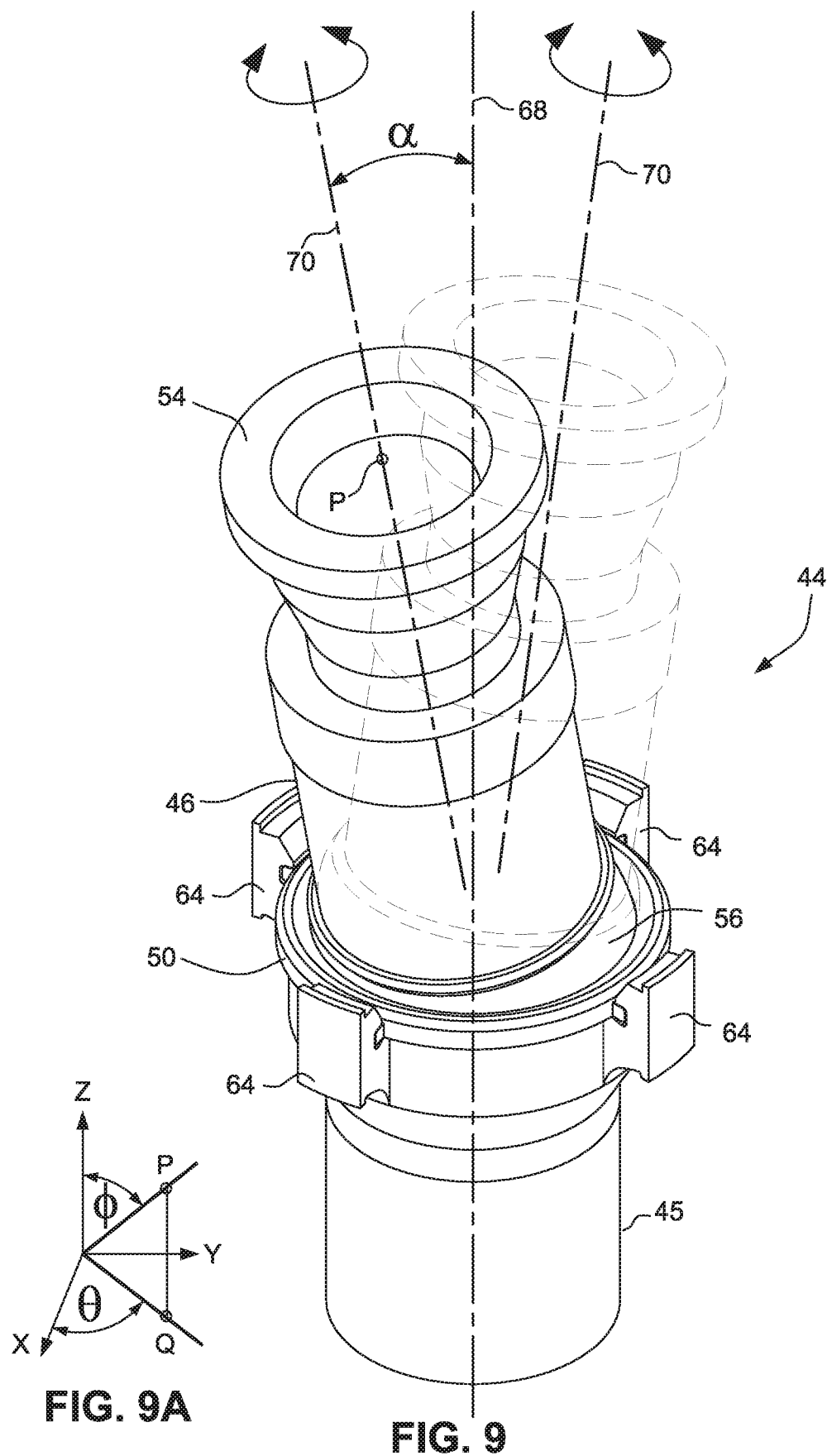
FIG. 9 is another perspective view of the adjustable portion of the hose.
FIG. 9A is an illustration of an exemplary spherical coordinate system.
Figure 10:
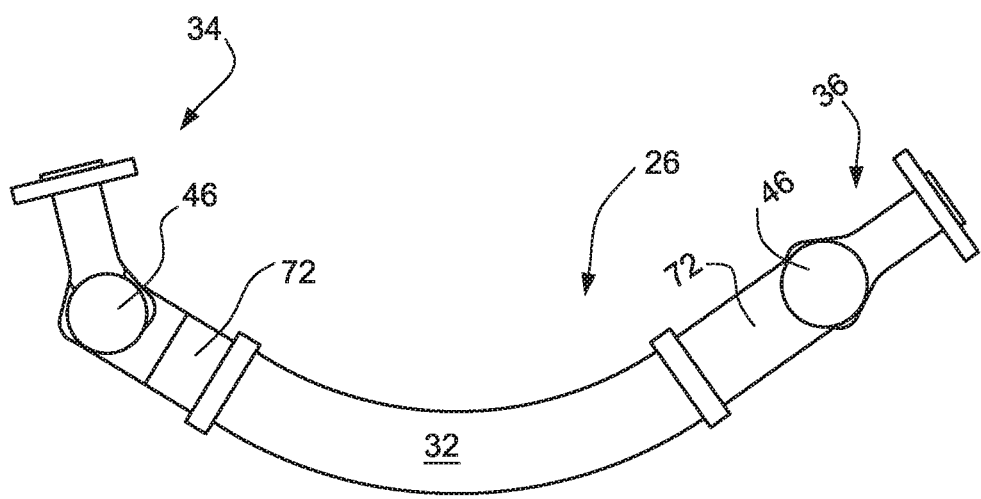
FIG. 10 is a schematic view of the hose.

As can be seen in FIGS. 8 and 9, the ring 50 may secure the adjustable portion 46 to the fixed portion 45 while also allowing the adjustable portion 46 to rotate around a central longitudinal axis 70 of the adjustable portion 46. The adjustable portion 46 may also pivot relative to the fixed portion 45 so that the central longitudinal axis 70 of the adjustable portion 46 forms an angle α with the central axis 68 of the fixed portion 45. In addition, the freedom of movement of the adjustable portion 46 relative to the fixed portion 45 may define a cone-shaped zone of possible orientations with a tip of the cone being located at a pivot point within the pivoting end 56 of the adjustable portion 46.

The freedom of movement of the adjustable portion 46 may also be described in terms of spherical coordinates. FIG. 9A shows an x, y, z spherical coordinate system. Point P corresponds to the point P illustrated in FIG. 9. In FIG. 9, the point P represents a point on the central longitudinal axis 70 at the furthest extent of the connection end 54 of the adjustable portion 46. In FIG. 9A, $\phi$ may be an angle between the z-axis and a line segment from the origin of the spherical coordinate system to the point P. In addition, Q may be the projection of point P to the xy-plane. $\theta$ may be the angle between the x-axis and the line segment from the origin to Q. When using the spherical coordinate system of FIG. 9A to describe the range of movement of the adjustable portion 46 relative to the fixed portion 45, $\theta$ may be 360 degrees. In addition, $\phi$ may be anywhere from 0 to substantially 90 degrees. For example, $\phi$ may be substantially 70 degrees, substantially 60 degrees, substantially 45 degrees, substantially 35 degrees or substantially 20 degrees.

It should be understood that the pivotal assembly 44 may be capable of a sharper bend without collapsing the fluid flow path 52 than the central flexible portion 32. For example, a bend radius of the flexible hose 26 may be zero at the pivotal assembly 44. At the same time, a minimum bend radius of the central flexible portion 32 may be greater than zero. Accordingly, a minimum bend radius of the flexible hose 26 (that does not collapse the fluid flow path 52) at the central flexible portion 32 may be greater than a minimum bend radius (that does not collapse the fluid flow path 52) of the flexible hose 26 at the pivotal assembly 44. Providing different flexible hose sections with different bending capabilities may increase the adaptability of the flexible hose 26 to different fuel line 20 and combustion chamber 14 configurations.

Figure 11:
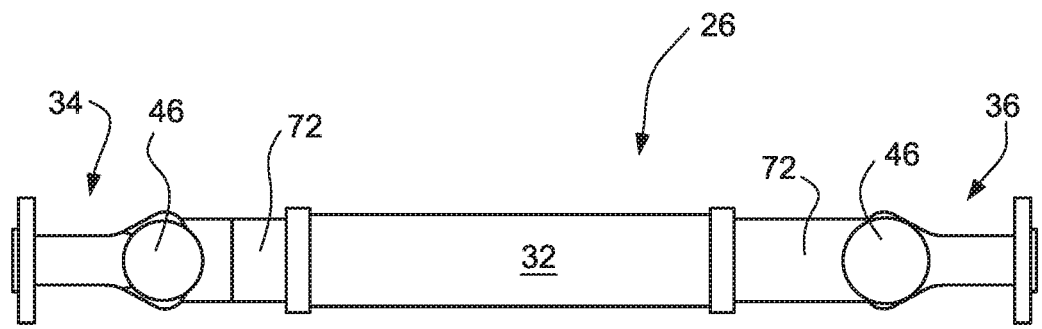
FIG. 11 is another schematic view of the hose.

As shown in FIG. 11, the pivotal assembly 44 may be part of both of the first and second connector portions 34, 36. Alternatively, the pivotal assembly 44 may be part of the second connector portion 36 instead of the first connector portion 34.

Figure 12:
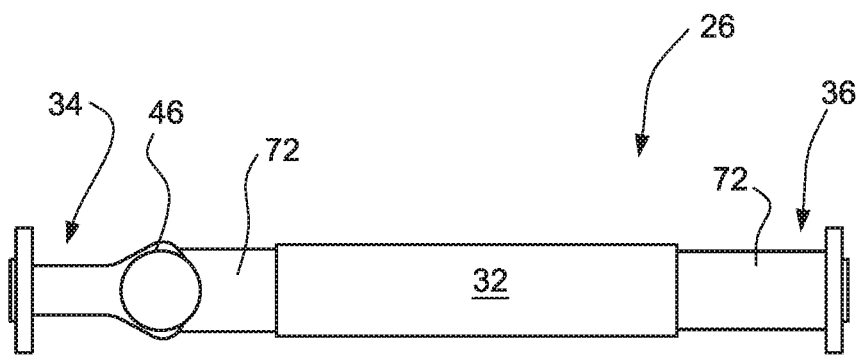
FIG. 12 is another schematic view of the hose.

Furthermore, as illustrated in FIGS. 11 and 12, either or both of the first and second connector portions 34 and 36 may include telescoping or retractable portions 72 that may allow the first and second connector portions 34, 36 to increase or decrease in length. It is also contemplated that central flexible portion 32 may be retractable to increase and decrease its length.

As used throughout the specification and claims, "substantially" includes at least deviations from ideal or nominal values that are within manufacturing, operational and/or inspection tolerances. As used throughout the specification, estimating is in reference to a current value and predicting is in reference to a future value.

The present disclosure may be applied to the variety of gas turbine engines that compress an ingested air, such as, but not limiting of, a heavy-duty gas turbine; an aero-derivative gas turbine; or the like. An embodiment of the present disclosure may be applied to either a single gas turbine engine or a plurality of gas turbine engines. An embodiment of the present disclosure may be applied to a gas turbine engine operating in a simple cycle or combined cycle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine engine system comprising:
    a fuel delivery circuit configured to convey fuel;
    a combustion chamber configured to combust the fuel; and
    a flexible hose that fluidly connects the fuel delivery circuit to the combustion chamber, the flexible hose comprising:
        a combustion chamber connector portion attached to the combustion chamber;
        a fuel delivery circuit connector portion attached to the fuel delivery circuit; and
        a central flexible portion connecting the combustion chamber connector portion to the fuel delivery circuit connector portion, the central flexible portion defining a central longitudinal axis when the central flexible portion is in a straight condition,
    wherein the central flexible portion is made of a flexible material;
    wherein the fuel delivery circuit connector portion comprises a pivotal assembly with a fixed portion, an adjustable portion, and a securing ring on an exterior of the adjustable portion, the securing ring being configured to engage the fixed portion to secure the adjustable portion in place within the pivotal assembly;
    wherein the adjustable portion is pivotal relative to the central longitudinal axis while the adjustable portion is secured in place by the securing ring;
    wherein the adjustable portion forms part of a flow path for the fuel, and
    wherein the central flexible portion has a first minimum bending radius that is greater than a second minimum bending radius of the pivotal assembly.

2. The gas turbine engine system of claim 1, wherein the adjustable portion of the pivotal assembly is also rotatable around the central longitudinal axis.

3. The gas turbine engine system of claim 1, wherein the adjustable portion is configured to be received within the fixed portion, the adjustable portion being free to pivot around a pivot point within the fixed portion, and wherein the adjustable portion and the fixed portion are configured so that when the adjustable portion is received within the fixed portion and secured by the securing ring, the flow path for the fuel is continuous through the adjustable portion and the fixed portion.

4. The gas turbine engine system of claim 3, wherein the pivotal assembly further comprises a seal positioned between the adjustable portion and the fixed portion, the seal being configured to prevent a leakage of fluid between the adjustable portion and the fixed portion regardless of an orientation of the adjustable portion relative to the fixed portion.

5. The gas turbine engine system of claim 4, wherein the adjustable portion is mechanically locked to the fixed portion.

6. The gas turbine engine system of claim 1, wherein the combustion chamber comprises a plurality of cans and the flexible hose is one of a plurality of flexible hoses that connect the cans to the fuel delivery circuit, each of the plurality of flexible hoses comprising respective combustion chamber connection portions, fuel delivery circuit connector portions and central flexible portions, wherein each of the central flexible portions is made of the flexible material, and the respective fuel delivery circuit connector portions each comprise a respective pivotal assembly, each pivotal assembly comprising a respective adjustable portion that is pivotal relative to a respective central longitudinal axis of the central flexible portion of the respective flexible hose when the central flexible portion is in the straight condition.

7. The gas turbine engine system of claim 1, wherein the fuel delivery circuit connector portion comprises another pivotal assembly with an adjustable end that is pivotal relative to the central longitudinal axis.

8. The gas turbine engine system of claim 1, further comprising a compressor and a turbine section.

9. A gas turbine engine system comprising:
   a fuel delivery circuit configured to convey fuel;
   a combustion chamber configured to combust the fuel; and
   a flexible hose that fluidly connects the fuel delivery circuit to the combustion chamber, the flexible hose defining a central longitudinal axis when the flexible hose is in a straight condition, the flexible hose comprising:
      a bendable portion made of a flexible material that allows the bendable portion to bend; and
      a pivotal portion disposed at a first end of the bendable portion, the pivotal portion including a ball and socket connection that allows the first end of the flexible hose to pivot relative to the central longitudinal axis;
   wherein the ball and socket connection is configured to be held together by a securing ring on an exterior of the ball and socket connection; and
   wherein the securing ring is configured to allow the first end of the bendable portion to be pivotal relative to the central longitudinal axis while the ball and socket connection is secured together by the securing ring.

10. The gas turbine engine system of claim 9, wherein an adjustable member with a rounded end defines a ball of the ball and socket connection, and a fixed member having a receiving portion that receives the rounded end of the adjustable member defines a socket of the ball and socket connection.

11. The gas turbine engine system of claim 10, wherein the adjustable member and the fixed member are mechanically locked to each other.

12. The gas turbine engine system of claim 10, wherein the fixed member is rigidly attached to the bendable portion.

13. The gas turbine engine system of claim 9, wherein the first end of the flexible hose has a greater range of movement relative to the central longitudinal axis of the flexible hose than the bendable portion.

14. The gas turbine engine system of claim 9, further comprising a second ball and socket connection being located on a second end of the bendable portion.

15. The gas turbine engine system of claim 9, further comprising a compressor and a turbine section.

16. A gas turbine engine system comprising:
   a fuel delivery circuit configured to convey fuel;
   a combustion chamber configured to combust the fuel; and
   a flexible hose that fluidly connects the fuel delivery circuit to the combustion chamber, the flexible hose comprising a) a central bendable region with a first minimum bending radius and b) a second bendable region with a second minimum bending radius,
   wherein the first minimum bending radius is greater than the second minimum bending radius.

17. The gas turbine engine system of claim 16, wherein the central bendable region is made of a flexible material that allows the central bendable region to bend.

18. The gas turbine engine system of claim 17, wherein the second bendable region comprises a ball and socket connection that allows the second bendable region to bend.

19. The gas turbine engine system of claim 16, wherein the second bendable region comprises an adjustable member mechanically lockable to a fixed member in a pivotal relationship; and wherein the adjustable member defines a first lumen, and the fixed member defines a second lumen, such that the first lumen and the second lumen collectively define a continuous flow path for the fuel when the adjustable member is mechanically locked to the fixed member.

20. The gas turbine engine system of claim 16, further comprising a compressor and a turbine section.

21. The gas turbine engine of claim 1, wherein the securing ring is configured to come into engagement with the fixed portion by sliding along an exterior of the adjustable portion.

22. The gas turbine engine of claim 21, wherein the securing ring is configured to interlock with a securing part of the fixed portion by rotating around the adjustable portion.

23. The gas turbine engine of claim 10, wherein the securing ring is configured to come into engagement with the fixed member by sliding along an exterior of the adjustable member.

24. The gas turbine of claim 23, wherein the securing ring is configured to interlock with a securing part of the fixed member by rotating around the adjustable member.

25. The gas turbine engine system of claim 16, wherein the second bendable region is at a connection end of the flexible hose, and wherein the second bendable region is configured to be pivotal while the flexible hose is connected to the fuel delivery circuit and/or the combustion chamber.

* * * * *